(12) United States Patent
Kurtz et al.

(10) Patent No.: US 8,847,922 B1
(45) Date of Patent: Sep. 30, 2014

(54) CALIBRATING OF INTERACTIVE TOUCH SYSTEM FOR IMAGE COMPOSITING

(71) Applicants: Victoria W. Kurtz, Toledo, OH (US); Rebecca Afzal, Perrysburg, OH (US); Carol Ann Wedding, Toledo, OH (US)

(72) Inventors: Victoria W. Kurtz, Toledo, OH (US); Rebecca Afzal, Perrysburg, OH (US); Carol Ann Wedding, Toledo, OH (US)

(73) Assignee: Imaging Systems Technology, Inc., Toledo, OH (US)

( * ) Notice: Subject to any disclaimer, the term of this patent is extended or adjusted under 35 U.S.C. 154(b) by 1 day.

(21) Appl. No.: 13/709,461

(22) Filed: Dec. 10, 2012

Related U.S. Application Data

(63) Continuation-in-part of application No. 12/200,951, filed on Aug. 29, 2008, now Pat. No. 8,330,730.

(60) Provisional application No. 60/969,718, filed on Sep. 4, 2007.

(51) Int. Cl.
*G06F 3/042* (2006.01)
*G06F 3/041* (2006.01)

(52) U.S. Cl.
CPC .................................. *G06F 3/0416* (2013.01)
USPC .......................................... 345/175; 348/592

(58) Field of Classification Search
USPC .......... 345/156–184; 348/592, 204.1–208.13, 348/207.99
See application file for complete search history.

(56) References Cited

U.S. PATENT DOCUMENTS

| | | | | |
|---|---|---|---|---|
| 5,940,139 | A * | 8/1999 | Smoot | 348/584 |
| 6,337,681 | B1 * | 1/2002 | Martin | 345/178 |
| 2005/0151850 | A1 * | 7/2005 | Ahn et al. | 348/207.99 |
| 2007/0075997 | A1 * | 4/2007 | Rohaly et al. | 345/419 |
| 2010/0026901 | A1 * | 2/2010 | Moore et al. | 348/659 |

FOREIGN PATENT DOCUMENTS

EP 1039365 A2 * 9/2000

* cited by examiner

*Primary Examiner* — Liliana Cerullo
(74) *Attorney, Agent, or Firm* — Donald K. Wedding

(57) ABSTRACT

A chroma-key/matte display screen system with a touch input device that allows a user to interact with the display by selecting or pointing to composite images on the display. Touch input devices include camera based, infrared, membrane, and acoustic. Displays screens include CRT, various flat screen displays such as plasma, LCD, OLED, and various projection display systems.

9 Claims, 9 Drawing Sheets

Calibration Factor Library Template Storage

| Screen Aspect Ratio | Screen Pixels | Touch Panel size ratio & screen position #1 | Touch Panel size ratio & screen position #n | Touch Panel size ratio & screen position #n+1 |
|---|---|---|---|---|
| 16 to 9 | 1980x1090 | Calibration a1 | Calibration a(n) | Calibration a(n+1) |
| 16 to 9 | 1280x720 | Calibration b1 | Calibration b(n) | Calibration b(n+1) |
| 16 to 9 | | | | |
| 16 to 9 | | | | |
| 16 to 9 | | | | |
| 16 to 9 | | | | |
| 16 to 9 | | | | |
| 4 to 3 | 780x480 | Calibration c1 | Calibration c(n) | Calibration c(n+1) |
| 4 to 3 | 780x576 | Calibration d1 | Calibration d(n) | Calibration d(n+1) |
| 4 to 3 | | | | |
| 4 to 3 | | | | |
| 4 to 3 | | | | |
| 4 to 3 | | | | |
| 4 to 3 | | | | |

FIG. 4

CALIBRATING OF INTERACTIVE TOUCH SYSTEM FOR IMAGE COMPOSITING

RELATED APPLICATIONS

This application is a continuation-in-part under 35 U.S.C. 120 of U.S. patent application Ser. No. 12/200,951 filed Aug. 29, 2008, to issue as U.S. Pat. No. 8,330,730, which claims priority under 35 U.S.C. 119(e) from U.S. Provisional Application Ser. No. 60/969,718, filed Sep. 4, 2007, all incorporated herein by reference.

INTRODUCTION

This invention relates to a touch input device system comprising a chroma-key/matte display system with a calibrated touch input system near or on a matte. More particularly, this invention relates to a chroma-key/matte display screen system with a touch input device that allows a user to interact with the display by selecting or pointing to composite images on the display. Touch input devices include camera based, infrared, membrane, and acoustic. Display screens include CRT, various flat screen displays such as plasma, LCD, OLED, and various projection display systems.

A chroma-key/matte or compositing system is a system that joins or mixes two images (usually a foreground image and a background image). This is usually done by the removal of a color (or small color range) from one image to reveal another "behind" it. The removed color becomes transparent. This technique is also referred to as chroma-key, color keying, or color separation overlay. It is typically used for weather illustrations. It is also used for virtual TV studios and motion picture studios where a scene is created behind a person animal, or object. The presenter, for example a TV weather person, appears to be standing in front of a large map or other background, but in the studio there is actually a large blue or green matte which is a background or backdrop. Chroma-key provides the virtual background on which images appear to be projected when viewed from a camera and the viewing monitor.

A touch system is an electronic system consisting of a touch input device and a display screen. It generally includes hardware and software control and processing means that mediate the electrical interaction between the touch input device and display screen. Calibration of a touch system is the act of aligning the active area of a touch input device with the active area of a display screen.

BACKGROUND

Technical advances in compositing image processing systems have facilitated and generalized the use of highly-saturated studio environments in which to film talents performing a scene, which should subsequently be composited in an alternative background. "Blue screen" techniques in video environments and "green-screen" techniques in cinematographic environments are well known, wherein talents, presenters or models are filmed in a studio configured with respectively blue- or green-saturated surroundings, in order to generate a clip of foreground image frames. An alternative clip of background image frames is subsequently generated and a compositing process allows an image editor to seamlessly blend the foreground and background image frames by means of keying parts of the corresponding video signals, for instance the luminance or chrominance signal, which is known to those skilled in the art as "chroma-keying". Such image data processing has long been provided by means of dedicated hardware, for instance, the Ultimatte system provided by the Ultimatte Corporation which also provides a competitive "matte" format to accomplish the same task.

The present invention provides interactive touch system control commands and drawing images to the image compositing system using matte/chroma-key compatible blue- or green-saturated surroundings. Prior art employs a touch panel overlay upon a large screen video monitor both of which become part of the foreground image that is composited into the background image. The foreground video camera thus captures the images of a person making the presentation, the image displayed on the display monitor, and the visible portion of the touch panel. Since the touch panel overlays a display monitor, calibration of the touch panel and the image once established is maintained by the physical relationship between the touch panel and the display monitor. The present invention does not require a display monitor, rather the touch system is calibrated to the fiducial image of the active area of the touch system as perceived in the matte/chroma-key image compositor display monitor. Thus, interactivity of the talent or presenter making the presentation is not limited by the display monitor that is surrounded by the touch screen. Further, the expense of a large display screen is also eliminated. With touch system interaction on a matte/chroma-key backdrop the composite image provides the greater perception of interactivity with the background subject matter of the presentation. The present invention provides for the set-up and calibration of interactive touch system control integrated to matte/chroma-key image compositing systems. A number of terms used the art include the following:

Touch input device is an input device used in electronic systems that allows a user to interact by selecting or pointing to images on a display screen. Touch input devices include camera based, infrared, membrane and acoustic, resistive, surface capacitive, projected capacitive, surface acoustic wave, optical, bending wave, active digitizer, photo sensor in pixel, polymer waveguide, distributed light, strain gauge, multi-touch, dual-force touch, and laser-point activated touch.

Display screens include CRT, various flat screen displays such as plasma and LCD, and various projection systems. A display may also include blue screen/green-screen or chroma-key/matte systems. Matte/Chroma-key imaging compositing is a system that joins or mixes two images (usually a foreground image and a background image). "Blue screen" techniques in video environments and "green-screen" techniques in cinematographic environments are well known, wherein talents or models are filmed in a studio configured with respectively blue- or green-saturated surroundings, in order to generate a clip of foreground image frames. An alternative clip of background image frames is subsequently generated and a compositing process allows an image editor to seamlessly blend the foreground and background image frames by means of keying parts of the corresponding video signals, for instance the luminance or chrominance signal, which is known to those skilled in the art as chroma-keying. This technique is also referred to as color keying, color separation overlay, green-screen and blue screen. It is typically used for weather forecasts. The presenter appears to be standing in front of a large map, but in the studio it is actually a large blue or green background. Matte is an alternative process variant of data processing by means of using dedicated hardware for image compositing.

A touch system is an electronic system consisting of a touch input device and a display screen. It generally includes hardware and software control and processing means that mediate the electrical interaction between the touch input device and the display screen.

Calibration of a touch system is the act of aligning the active area of a touch input device with the active area of a display screen.

Chroma-key/matte backdrop is the background on which the images appear to be projected when viewed from a camera.

In one embodiment, the matte/chroma key video system comprises using the infrared (IR) from the touch device or from another IR source to saturate the matte/chroma key screen area and create the composite images. In this embodiment, the system uses the IR wavelength as the keying color such that a blue or green wall is not required. In the practice of this embodiment, any wall may be used. In this embodiment, an IR camera is used in conjunction with a regular camera. The fiducials are placed on the wall such as lightly painting. The IR band is calibrated to include reflections of any selected color wavelengths.

PRIOR ART

Compositing Systems

The following U.S. patents relate to compositing systems, image modeling, image simulation, and image processing. U.S. Pat. No. 4,100,569 (Vlahos), U.S. Pat. No. 6,020,931 (Bilbrey et al.), U.S. Pat. No. 4,417,791 (Erland et al.), U.S. Pat. No. 4,344,085 (Vlahos), U.S. Pat. No. 3,778,542 (Hanseman), U.S. Pat. No. 6,952,204 (Baumberg et al.), U.S. Pat. No. 7,209,181 (Kriegman), U.S. Pat. No. 4,979,021 (Thomas), U.S. Pat. No. 5,345,313 (Blank), U.S. Pat. No. 5,594,850 (Noyama et al.), U.S. Pat. No. 4,007,487 (Vlahos), U.S. Pat. No. 7,084,879 (Sevigny), are incorporated herein by reference.

IR Touch System

Infrared (IR) touch systems contemplated herein include those disclosed in U.S. Pat. No. 3,775,560 (Ebeling et al.), U.S. Pat. No. 3,860,754 (Johnson et al.), U.S. Pat. No. 4,243,879 (Carroll et al.), U.S. Pat. No. 4,267,443 (Carroll et al.), U.S. Pat. No. 4,323,774 (Kopp), U.S. Pat. No. 4,384,201 (Carroll et al.), U.S. Pat. No. 4,467,193 (Carroll), U.S. Pat. No. 4,645,920 (Carroll et al.), U.S. Pat. No. 4,672,364 (Lucas), U.S. Pat. No. 4,684,801 (Carroll et al.), U.S. Pat. No. 4,713,534 (Masters et al.), U.S. Pat. No. 4,761,637 (Lucas et al.), U.S. Pat. No. 4,797,556 (Marzari et al.), U.S. Pat. No. 4,799,044 (Masters et al.), U.S. Pat. No. 4,818,859 (Hough), U.S. Pat. No. 4,855,590 (Bures et al.), U.S. Pat. No. 4,943,806 (Masters et al.), U.S. Pat. No. 4,986,662 (Bures), U.S. Pat. No. 5,041,701 (Wolfe et al.), U.S. Pat. No. 5,055,840 (Bartlett), U.S. Pat. No. 5,164,714 (Wehrer), U.S. Pat. No. 5,220,409 (Bures), and U.S. Pat. No. 6,429,857 (Masters et al.), all of which are incorporated herein by reference.

Blue Screen

Blue screen is disclosed in U.S. Pat. No. 3,778,542 (Hanseman), U.S. Pat. No. 4,100,569 (Vlahos), U.S. Pat. No. 4,344,085 (Vlahos), U.S. Pat. No. 4,417,791 (Erland et al.), U.S. Pat. No. 5,764,306 (Steffano), U.S. Pat. No. 5,940,139 (Smoot), U.S. Pat. No. 6,020,931 (Bilbrey et al.), U.S. Pat. No. 6,885,744 (Bluestein et al.), U.S. Pat. No. 6,952,204 (Baumberg et al.), U.S. Patent Application Nos. 2005/0248539 (Morrison et al.), 2005/0164762 (Smith et al.), and 2002/0025066 (Pettigrew), all of which are incorporated herein by reference.

Blue Screen Matte

Blue screen matte is disclosed in U.S. Pat. No. 3,778,542 (Hanseman) and U.S. Pat. No. 4,968,132 (Ferren), both of which are incorporated herein by reference.

Chroma-key

Chroma-key is disclosed in U.S. Pat. No. 3,560,638 (Skrydstrup et al.), U.S. Pat. No. 3,678,182 (Boxman et al.), U.S. Pat. No. 3,959,813 (Legler), U.S. Pat. No. 4,051,520 (Davidse et al.), U.S. Pat. No. 4,183,045 (Herrmann et al.), U.S. Pat. No. 4,319,266 (Bannister), and U.S. Pat. No. 5,249,039 (Chaplin), all of which are incorporated herein by reference.

Weather Data Processing

Weather data processing is disclosed in U.S. Pat. No. 5,379,215 (Kruhoeffer et al.), U.S. Pat. No. 6,052,648 (Burfeind et al.), U.S. Pat. No. 6,490,525 (Baron Sr. et al.), and U.S. Pat. No. 6,683,609 (Baron Sr. et al.), all of which are incorporated herein by reference.

BRIEF DESCRIPTION OF THE DRAWINGS

FIG. 4 shows typical calibration factor library template storage containing correlation data.

DETAILED DESCRIPTION OF THE DRAWINGS

Figure 1:
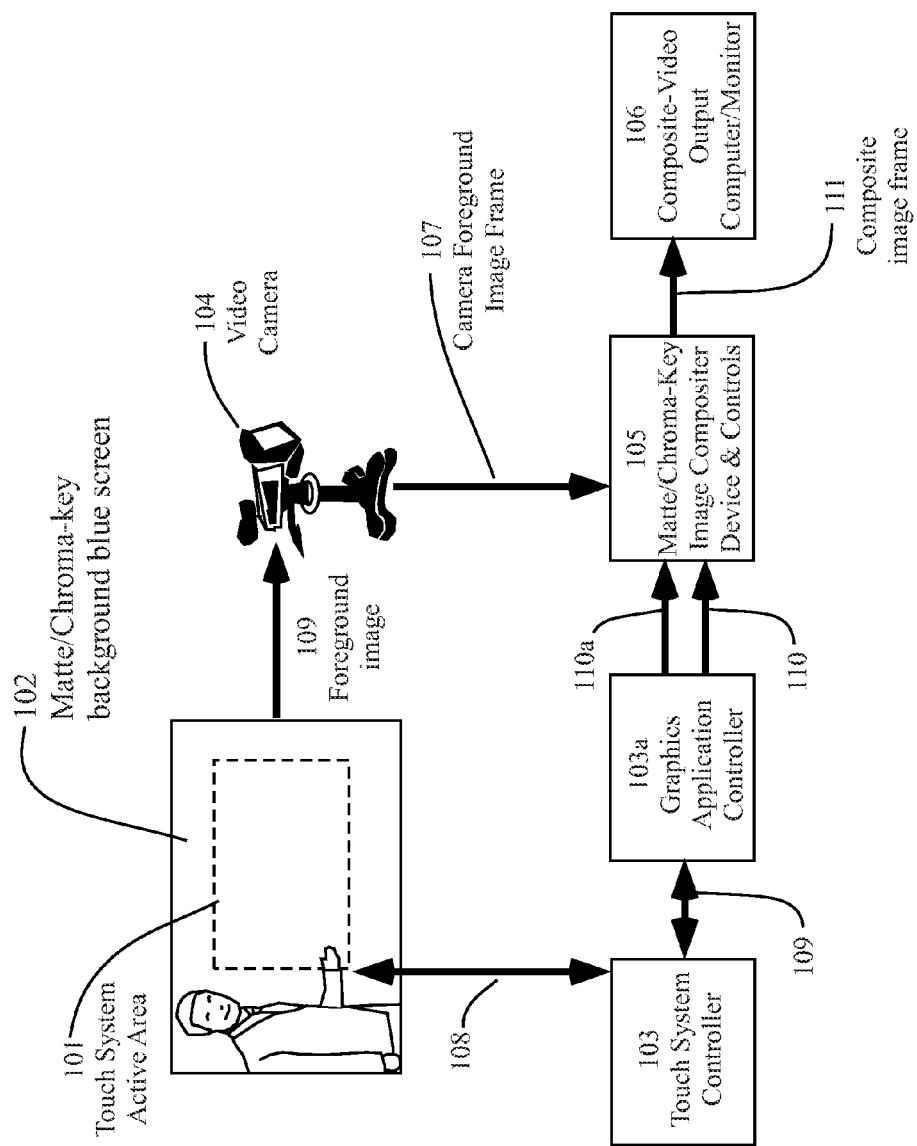
FIG. 1 shows a block diagram of a matte/chroma-key or blue screen system with a touch screen.

FIG. 1 shows a block diagram of a matte/chroma-key or blue screen system with a touch screen control to provide interactivity between the presenter in the foreground image and the background image. Through touch inputs the presenter controls the background image frame, inserts local images, inserts line drawings, and performs numerous other control functions. The touch control system is integrated into a matte/chroma-key background blue screen such that it is not visible in the foreground image; however, for calibration and alignment purposes, the touch system active area can be identified by fiducial location identifiers including temporary visible light illumination markers. FIG. 1 illustrates matte/chroma-key background blue screen 102 that contains touch system active area 101. The interactive touch system 101 is further comprised of a touch system controller 103 with graphics application controller 103a. The touch system control circuits 103 communicate with touch system active area 101 via communication link 108 and graphics application control circuits 103a communicate touch system controller 103 via communications link 109. Graphics controller 103a communicates with matte/chroma-key image compositing processor 105 via background image communications link 110 and calibration communications link 110a. Of course, said links may be multiplexed into a single physical linking circuit. Video camera 104 captures foreground imagery of the blue screen and presenter 109 and communicates the camera video imagery 107 to matte/chroma-key image compositor device 105. Matte/chroma-key image compositor device 105 receives background imagery 110, touch system optional calibration imagery 110a, and video blue screen image 107 performing matte/chroma-key imaging compositing process which communicates the composited image to composite—video monitor 106 and other video destinations as desired. Matte/chroma-key image compositing processor 105 provides versatile image combinations, e.g., a composited image of the foreground image 107, background image 110, and/or calibration template image 110a. All may be displayed simultaneously or any two of the three may be selected for display in the composited video monitor. For example, only background image 110 and the foreground image would be combined for display when the touch system is in calibration. Re-calibration is required whenever the virtual image of the touch panel active area changes in either size or position with respect to the composited image frame of view (FOV).

Figure 2:
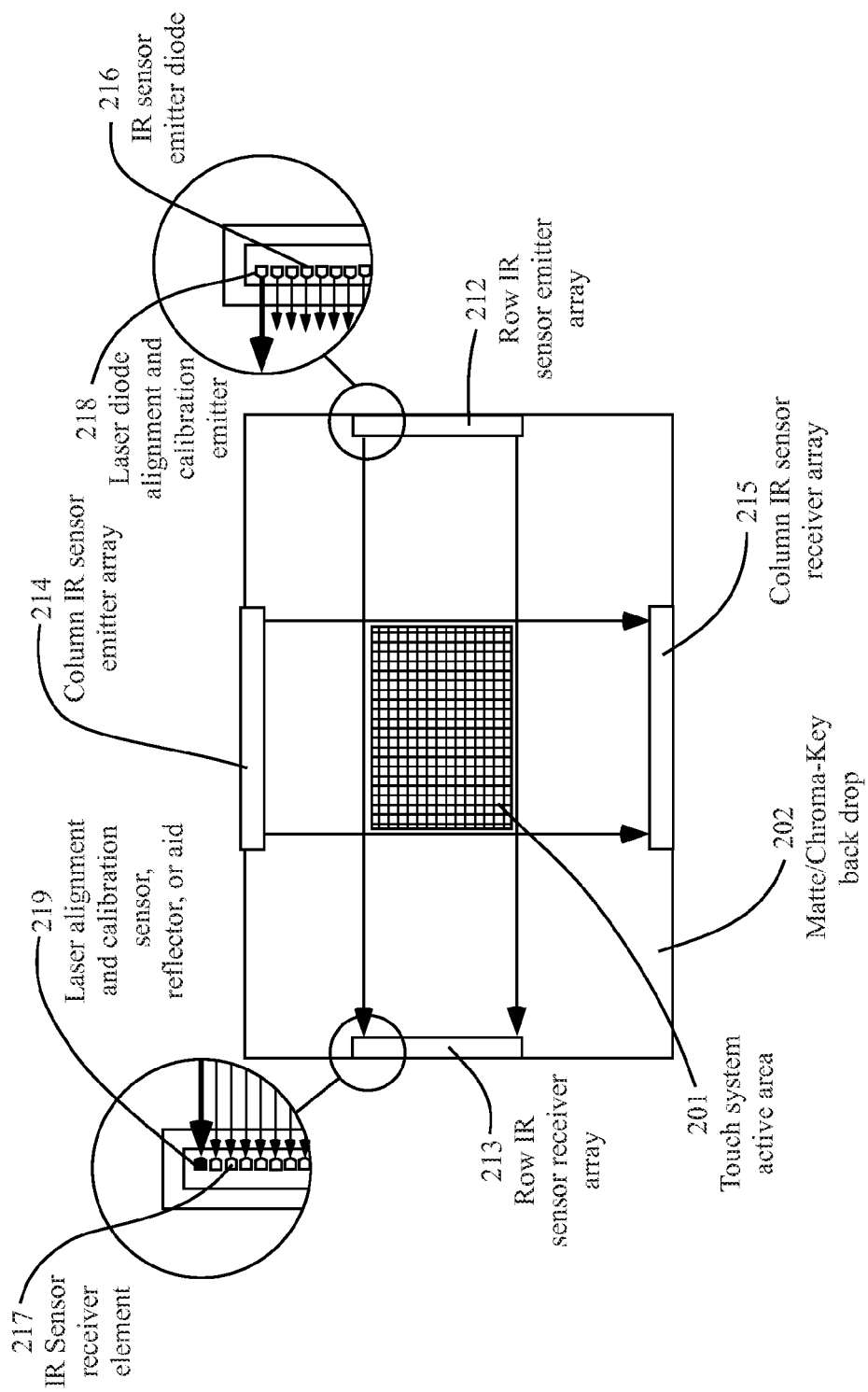
FIG. 2 shows a matte/chroma-key background blue screen containing a touch system active area.

FIG. 2 shows an embodiment of this invention for an IR touch system containing matte/chroma-key background blue screen 202, row IR sensor emitter array 212, row IR receiver array 213, column IR sensor emitter array 214, and column IR receiver array 215. The array of intersections of the row and column emitter arrays prescribes the touch system active area 201. Each transmitter array 213 and 214 contains a plurality of IR emitters 216 and one or more laser/light diode alignment calibration emitters 218. Each IR receiver array 213 and 215 contains a plurality of IR receivers 217 and one or more laser/light alignment calibration receivers 219. Laser/light diode illumination provides two functions, 1) to provide means for the installation and alignment of the touch system emitter and receiver arrays relative to one another, and 2) to provide temporal calibration fiducial markings upon the blue screen that defines the location of the touch system active area in the camera and composited image FOV. The use of temporal calibration fiducial markings is described in FIG. 4. Other embodiments of the touch system installation and alignment process are discussed in FIGS. 7 and 8.

Figure 3:
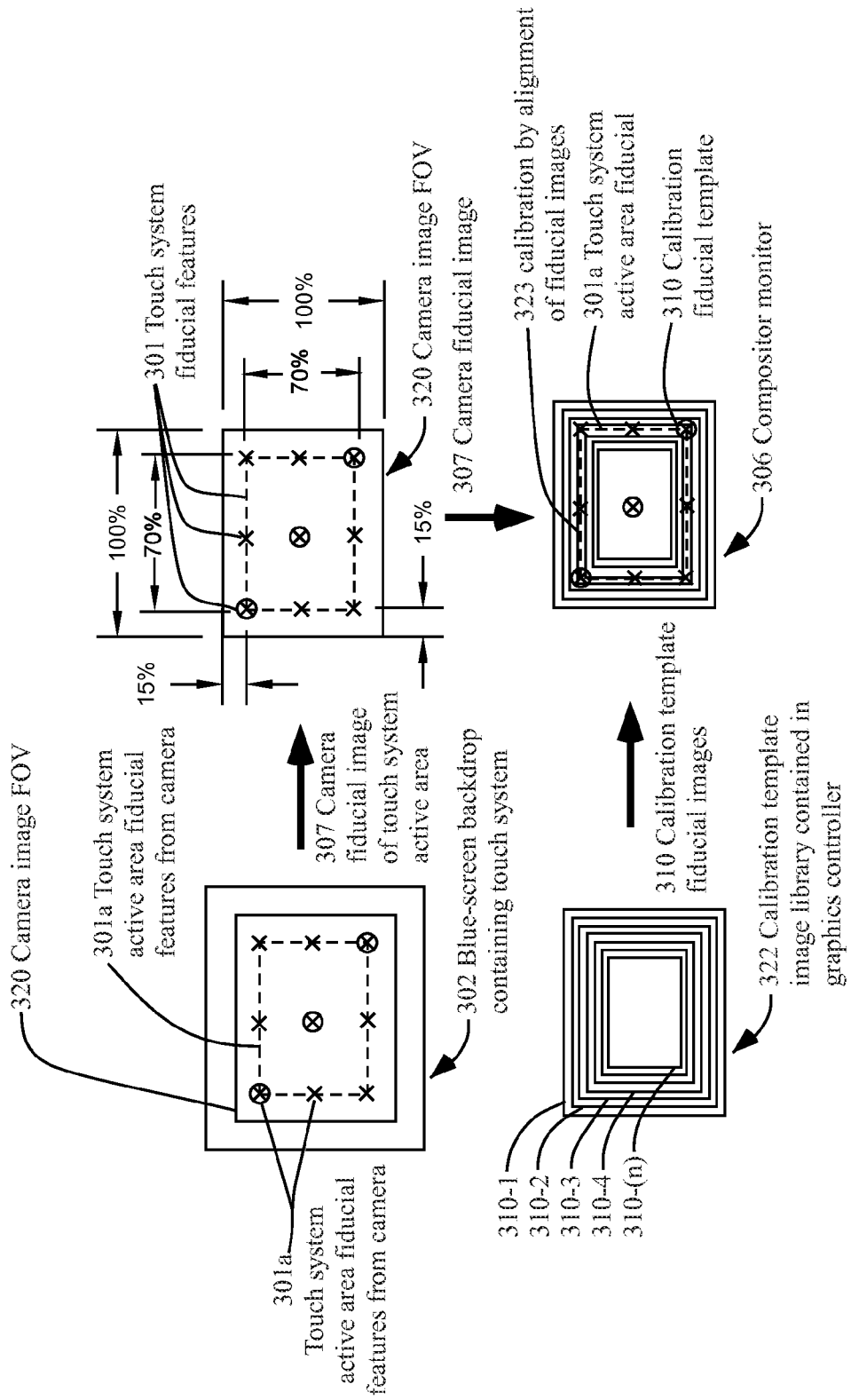
FIG. 3 shows the correlation and alignment of the touch system fiducial features and calibration fiducial templates pre-stored in the graphics application controller.

FIG. 3 shows the correlation and alignment of the touch system fiducial features and calibration fiducial templates pre-stored in the graphics application controller. Blue screen backdrop 302 contains the touch system active area 301 including select temporal fiducial features 301a. Fiducial features 301a are temporal so as not to interfere with the image compositing process during programming; thus the visual fiducial features are made visible in the foreground camera only during calibration procedures. A preferred embodiment provides lighted illumination of fiducial features 301a on the blue screen only during the time calibration is initiated during which foreground camera captures fiducial image 307.

Camera fiducial image 307 is characterized in size and position as a proportion of the camera FOV 320. The example figure illustrates a touch system active area characterized by an area 70% of the height and width of the camera FOV 320, centered within the camera FOV. Correlating this fiducial image with matching of a calibration template as seen in the compositor monitor 306 serves to calibrate the location of touch input by the presenter with the display of that input in the composited image. Poor calibration will manifest itself, especially during a drawing function, as an error in the display of the drawing relative to the background scene. For example, the lines or figures drawn may be distorted and/or displaced from the location in which the presenter created it in the composited display monitor 306. The calibration process is executed by recalling calibration templates 322 from the graphics controller memory and superimposing selected templates upon touch system fiducial images 301a as seen in compositor monitor 306. Touch system fiducial 301a is then compared to selected library calibration templates 310-1 through 310-(n) in compositor monitor display 310, and the matching template is applied to complete the calibration process. In example shown in FIG. 3, the template selected for proper calibration is 310-4.

Calibration may also be accomplished in the reverse sequence, i.e., a particular calibration template may be selected to capture a particular beneficial relationship of the touch system active area in the camera and composite image FOV, after which the camera operator may zoom the camera settings so as to change the size and position of the touch system fiducial 301a to match the selected calibration template.

The preceding illustration showed the condition where the camera FOV was larger than the virtual image of the touch system active area; however, this invention also applies to the situation where the camera FOV is zoomed in so that the virtual touch system active area is larger than the camera FOV; that is, the camera FOV is zoomed to view only a portion of the virtual image of the touch system active area. In this embodiment a number of additional temporal fiducial laser/light sources will be added, such that, a perimeter outline of multiple laser light sources are visible in the camera FOV any time that calibration is performed. If supplemental laser/light sources are provided, the number of light sources illuminated simultaneously will be limited to prevent false readings. This embodiment using additional laser/light sources is especially beneficial when used in combination with a "camera based touch system" because the active area of a "camera based touch system" may encompass the entire area of the blue screen backdrop. In such a case the camera FOV would likely be smaller than the total touch system active area resulting in the composited image FOV being smaller than the touch system active area field of view.

Embodiments of this invention use other touch input devices including "camera based touch system", "membrane", "acoustic", "resistive", "surface capacitive", "projected capacitive", "surface acoustic wave", "optical", "bending wave", "polymer waveguide", "distributed light", "multi-touch", "dual-force touch", and "laser-point activated touch".

FIG. 4 shows typical calibration factor library template storage file containing correlation data that is used to derive calibration factors through mathematical calculations and empirical alignment procedures.

For example, a matrix of calibration factors is derived to represent the plurality of conditions that would arise in correlating the virtual image of the touch system to the matte/chroma-key composite image. These conditions include the screen aspect ratio, e.g., 16×9 or 4×3 or other. Further, a plurality of different calibration factors is provided to correlate differences in the relative size and/or position of the virtual image of the touch system as seen in the matte/chroma-key composited image. The combination of all of these conditions may produce a large table of factors to be stored in the library: however, other embodiments may utilize a mathematical algorithm to calculate calibration factors on demand.

Figure 5:
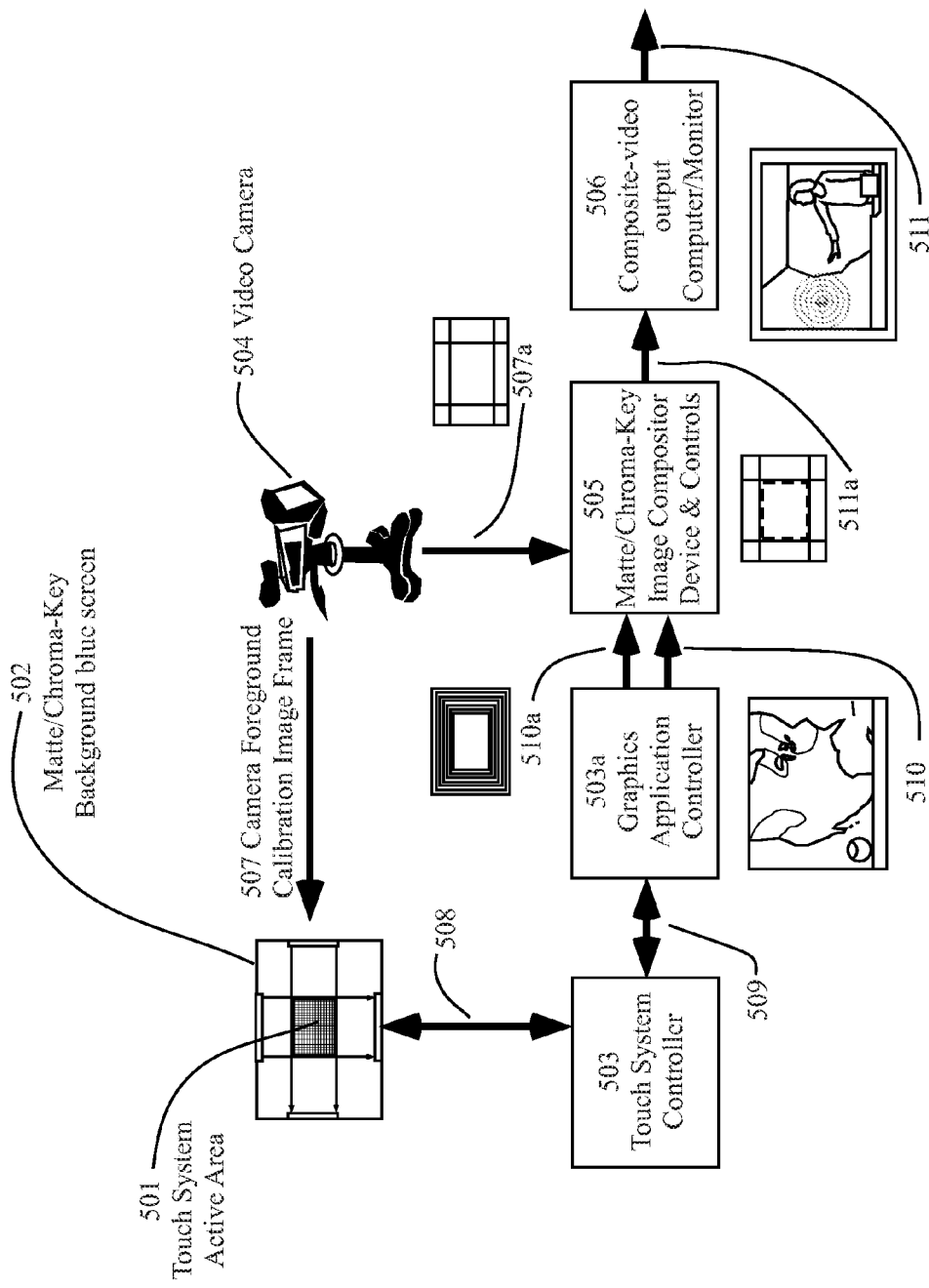
FIG. 5 shows a block diagram of a matte/chroma-key or blue screen system with a touch screen in calibration mode.

FIG. 5 shows a block diagram of a matte/chroma-key or blue screen system with a touch screen in calibration mode. The touch control system is integrated into the matte/chroma-key background blue screen such that it is not visible in the foreground image; however, for calibration and alignment purposes, the touch system active area is identified by fiducial location markers including temporal visible light illumination markers. FIG. 5 illustrates matte/chroma-key background blue screen 502 that contains touch system active area 501. The interactive touch system 501 is further comprised of a touch system controller 503 with graphics application controller 503a. The touch system controls circuits 503 communicate with touch system active area 501 via communication link 508, and graphics application control circuits 503a communicate touch system controller 503 via communications link 509. Graphics controller 503a communicates with matte/chroma-key image compositing processor 505 via background image communications link 510 (background image) and calibration communications link 510a, (calibration templates). Video camera 504 captures the foreground camera fiducial image 507a of the touch system active area and also communicates it to matte/chroma-key image compositor device 505. Matte/chroma-key image compositor device 505 receives background imagery 510, and touch system fiducial imagery 507a which it composites and displays on composite-video monitor 506. Successful calibration selection is verified by the matching of calibration template image 510a with temporal laser/light fiducial image 507. Calibration is maintained by changing the calibration template selection to match changes in camera and composite image FOV to produce a calibrated composite image 511. If calibration is not maintained or is inaccurate, defects such as image displacements will appear. For example, when a presenter makes a line drawing overlay using the touch system, the image of a line being drawn will be displaced away from the position of the presenter's hand or finger.

Figure 6:
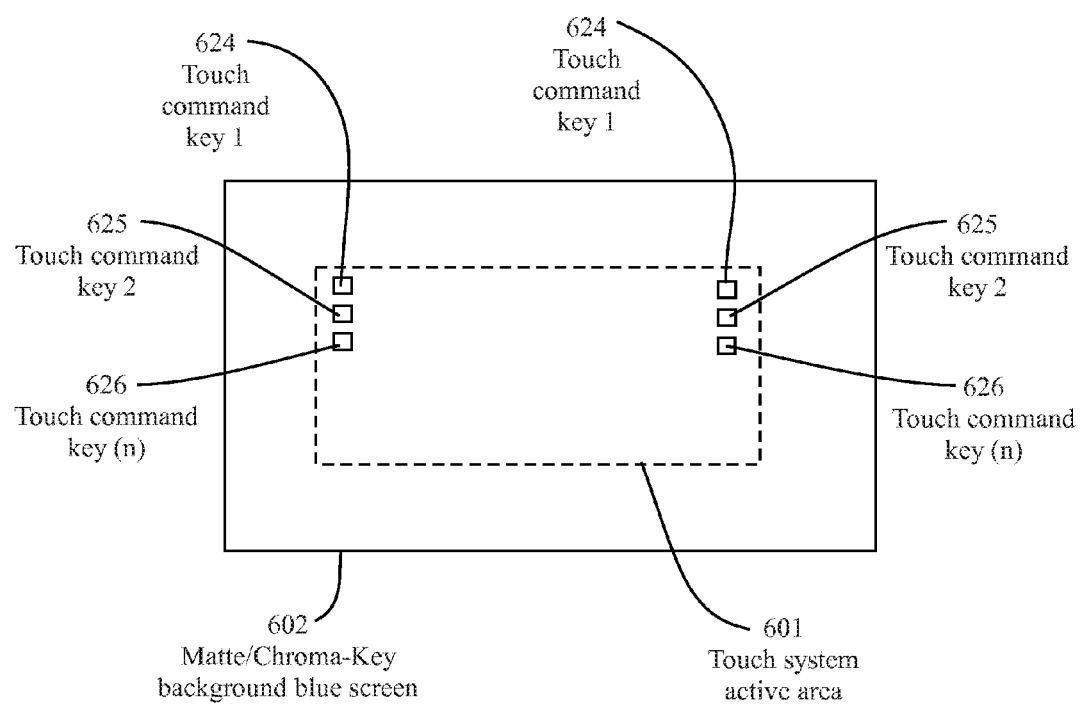
FIG. 6 shows a block diagram of a matte/chroma-key or blue screen system with a touch screen containing multiple touch command keys that provide presenter control functions.

FIG. 6 shows a block diagram of a matte/chroma-key or blue screen 602 with a touch system active area 601 containing multiple touch command keys 624, 625, and 626 that provide presenter control of a plurality of pre-programmed functions. Each control function key when selected provides specific functionality, and that key function may be replicated in multiple locations within the touch panel active area. For example, the same keys may be replicated on both sides of the blue screen to provide for convenient access from either side of the blue screen. The specific location of each key may be identified by blue markings of a slightly different shade of blue from that of the overall blue screen but is still visible to the presenter. If appropriate colors of blue are used the difference will not be discernable to the image compositing system processor and both will be removed in the compositing process.

Figure 7:
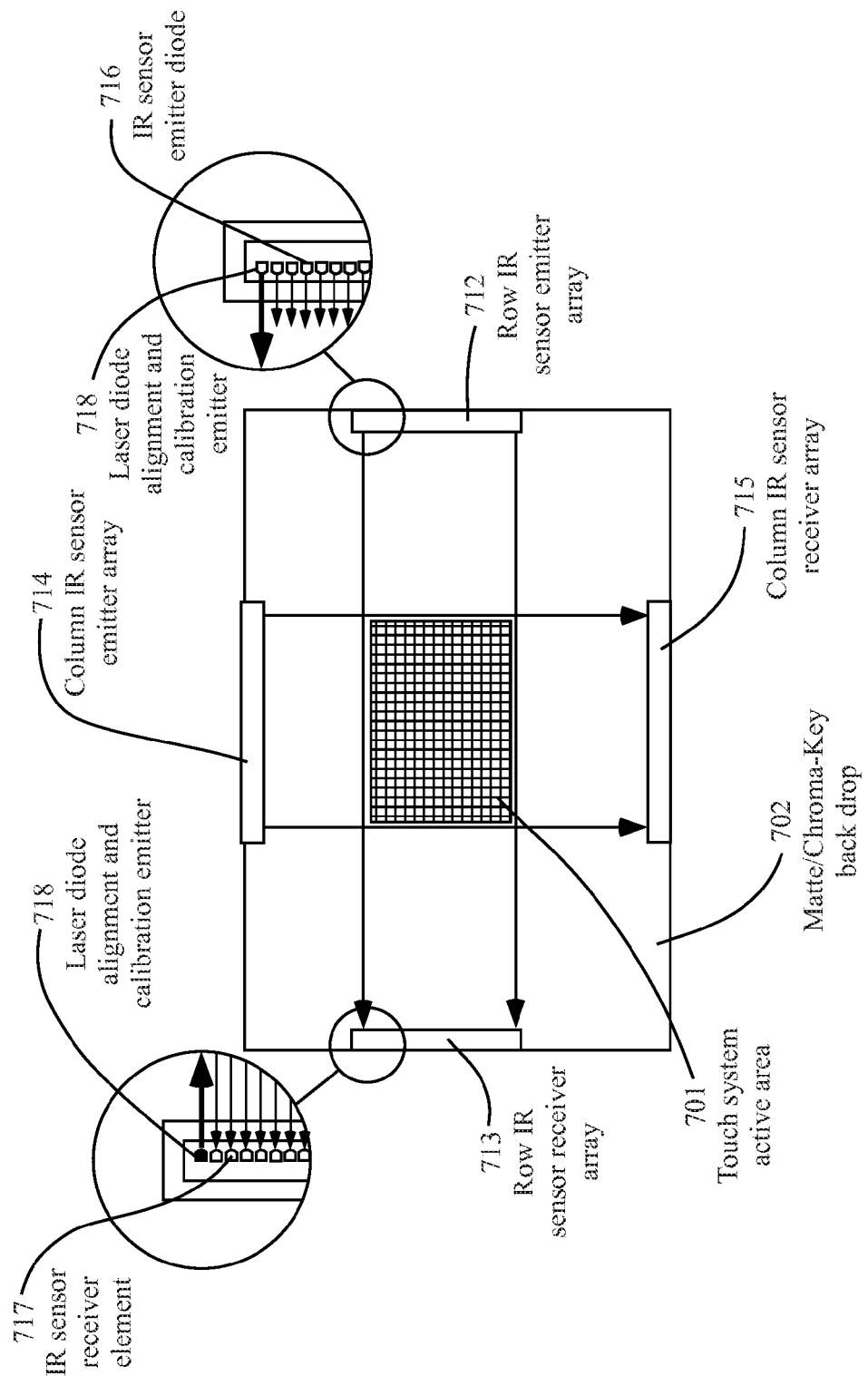
FIG. 7 shows a matte/chroma-key background blue screen containing a touch system active area.
Figure 8:
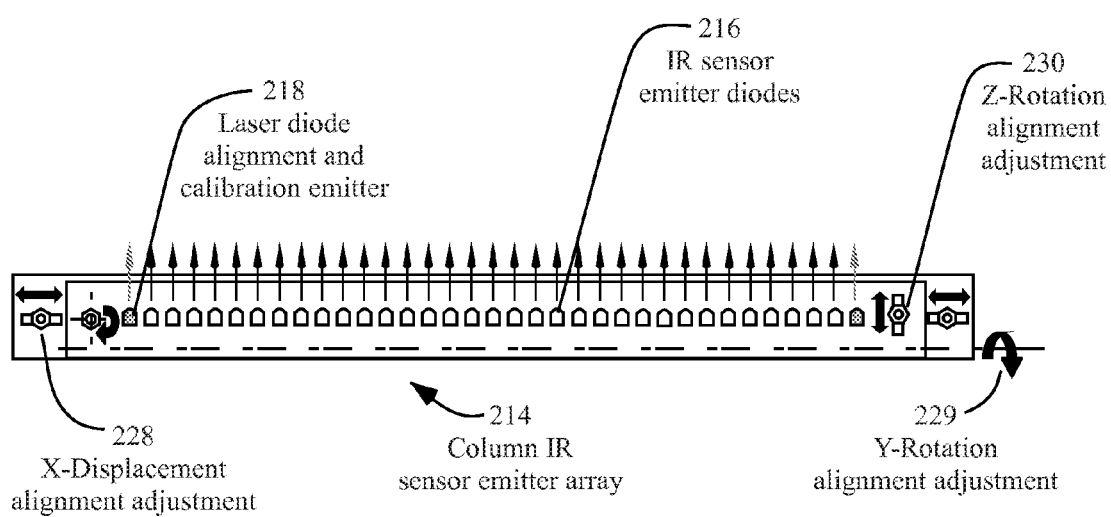
FIG. 8 shows an IR sensor circuit panel for one of the sides of the touch system with means to adjust each of the panels with respect to one another with multiple dimensions of linear and angular alignment.

FIG. 7 shows a second embodiment of this invention for an IR touch system containing matte/chroma-key background blue screen 702, row IR sensor emitter array 712, row IR receiver array 713, column IR sensor emitter array 714, and column IR receiver array 715. The array of intersections of the row and column emitter arrays prescribes the touch system active area 701. Each transmitter array 713 and 714 contains a plurality of IR emitters 716 and one or more laser/light diode alignment calibration emitters 718. Each IR receiver array 713 and 715 contains a plurality of IR receivers 717 and one or more laser/light alignment calibration receivers 719. This embodiment contains laser emitters on all four IR sensor and receiver units. Each laser alignment emitter is positioned so that its line-of-sight looks directly at an opposing laser emitter. Successful installation set-up and alignment of the IR sender and receiver units is accomplished when laser illuminator emissions meld into a single line of light. Redundant laser emitters provides for added ease in IR touch sensor installation set-up. Thus, laser/light fiducial illumination provides the means to accurately measure installation and alignment to determine when proper alignment has been achieved. FIG. 8 illustrates a convenient mechanical means to mount the sensor units so as to provide the precision adjustment of the locking means for proper alignment.

FIG. 8 shows an IR sensor circuit panel for one of the sides of the touch system with means to adjust each of the panels with respect to one another with multiple dimensions of linear and angular alignment. IR sensor emitter array 214 contains IR emitters 216, laser diode emitters 218 and a plurality of linear and angular adjustment means to provide for convenient installation and setup adjustment of the IR emitter and receiver arrays relative to one another. The pictured embodiment contains X-displacement adjustment 228, Y-rotational adjustment 229, and Z-rotational adjustment 230. Other embodiments providing with up to 6-degrees position adjustment may be used when it is beneficial.

Installation mounting, alignment and adjustment means as described herein are provided to accommodate all installation conditions including, wall mounting, free standing structures, picture frame type structures, hanging structures, deployable structures etc. The mounting structure may be afforded by any means that provides sufficient rigidity to preclude excessive movement of the sensor receiver units relative to one another after installation is complete.

For example, the process for installing active arrays comprised of printed circuit boards with infrared LED sensors and emitters mounted on the rigid strips as summarized in FIG. 3, includes, 1) preparation of a stable and rigid mounting structure for sensor array mounting and blue screen support, 2) positioning and loosely attaching the sensor arrays to the rigid & stable mounting structure so as to allow for final precision alignment of sensor emitter/receiver array pairs with laser alignment aid, 3) turning on laser alignment aid and accurately aligning sensor emitter/receiver pairs and locking sensor emitter/receiver array pairs into position, 4) connecting sensor/receiver pairs to touch system controller, and 5) checking the touch system to verify proper function. Alignment means may use a laser, laser receiver, laser reflector or other fiducial features to facilitate proper alignment of the IR sending and receiving units. Of course, other more conventional means may be also used to provide proper alignment between transmitter and receiver arrays such as, ordinary bubble levels, and precision mechanics tooling in a series of accurate measurements and adjustments. Numerous other mechanical aids are also well known in the art.

Figure 9:
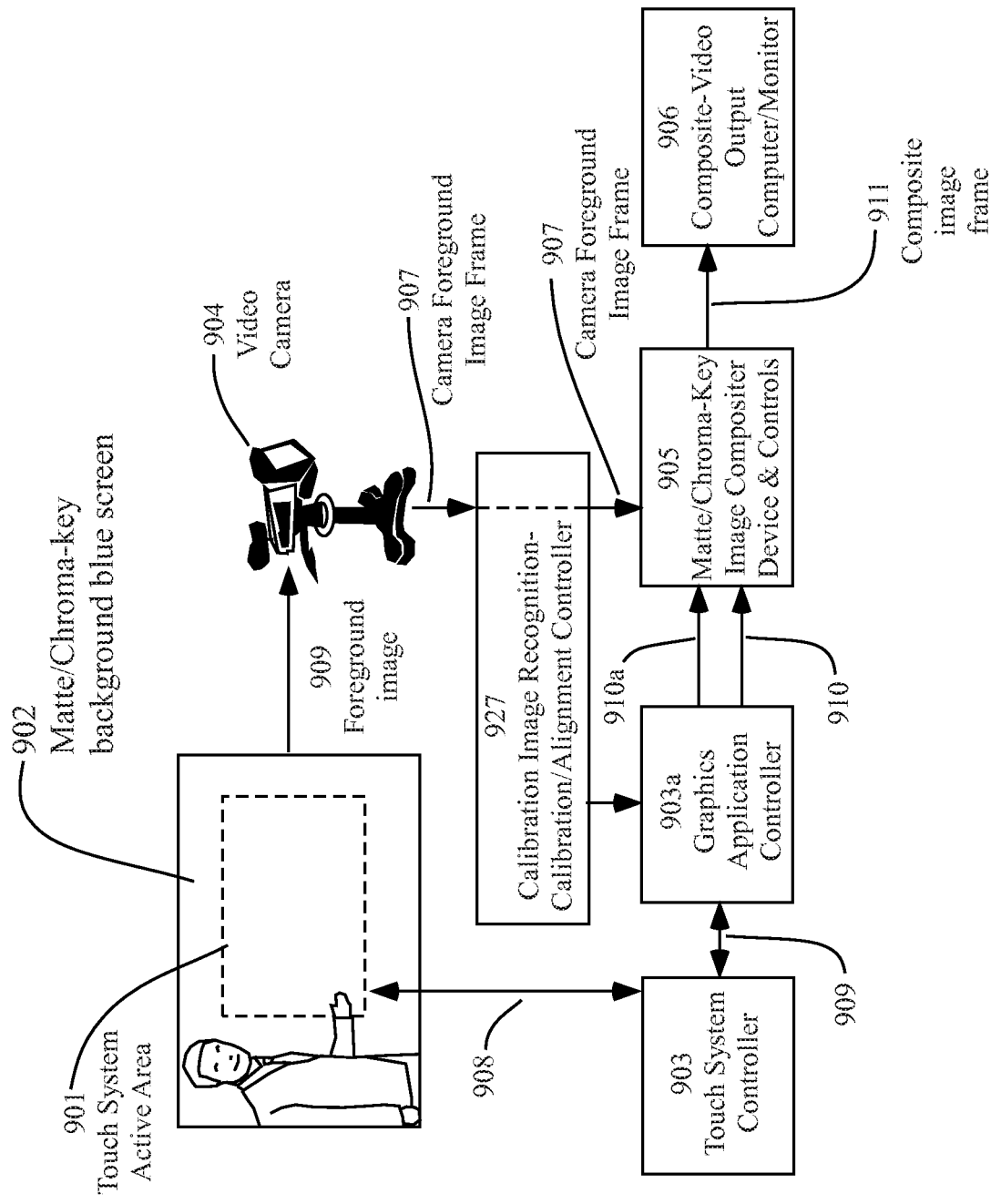
FIG. 9 shows a block diagram of a matte/chroma-key or blue screen system with a touch screen containing automated calibration of the touch system image calibration and alignment process.

FIG. 9 shows a block diagram of a matte/chroma-key or blue screen system embodiment containing a touch screen with automated calibration of the touch system image calibration and alignment process. It contains an image recognition means to determine the size and position of a lighted touch system fiducial box defining the perimeter of the touch system active area. Further, it compares the lighted fiducial perimeter in the context of the foreground camera field of view so as to select and retrieve the appropriate pre-stored calibration image template from a library of calibration templates. In this embodiment the fiducial perimeter of the touch system active area is lighted by a synchronized pulsed emission of four laser sources for a time duration of less than one frame exposure. The automated calibration sequence may be initiated at any time by sensing a change in camera settings, by command signals from a pre-stored script for the video programming, or by manual command by the operator. In response to calibration initiation, the calibration image recognition/calibration alignment controller 927 will trigger a duration emission laser light emissions of a single frame duration via calibration light control 928 to touch system controller 903. Simultaneously, calibration/alignment controller 927 steals one image frame containing the laser flash fiducial image of the touch system active area perimeter, and replaces that image with the prior image frame so as not to interrupt the function of the matte/chroma-key image compositor. The single frame flash image of the touch system active area perimeter fiducial markers is simultaneously subjected to image recognition software analysis to establish the position of the temporal lighted fiducial marks that locate the touch system active area within the composited image FOV. The derived position of the fiducial position of the touch system active area is then compared to calibration template image sizes and location stored in the calibration template library. Identification of the matching calibration template then completes the calibration process.

SUMMARY

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. A matte/chroma key video calibration system wherein a touch input device is calibrated with fiducial marks with respect to a camera and a composite image on a matte/chroma key screen, and wherein the matte/chroma key screen area is saturated with infrared light, the infrared light wavelength being a keying color, and wherein the matching of calibration factors comprises:
   storing calibration factor templates for selected touch system virtual images in a calibration library look-up table,
   initiating automatic calibration sequence by a change in camera settings, pre-stored script, robotic or operator command,
   illuminating a fiducial perimeter of the touch system active area by a synchronized pulsed light emission of four laser sources for a time duration of less than one frame exposure time long,
   selecting one image frame from the stored calibration factor templates containing a laser flash fiducial image of the touch system active area perimeter,
   subjecting the fiducial image to recognition software analysis to derive the position of the illuminated fiducial perimeter of the touch system active area,
   retrieving appropriate calibration factor templates from memory,
   comparing calibration factor templates to the size and position of the touch system active area fiducial image,
   selecting and loading the calibration factor template that matches the fiducial image, and
   completing the calibration.

2. The invention of claim 1 wherein correlated data is used to derive additional calibration factors through mathematical calculation.

3. The invention of claim 1 wherein correlated data is used to derive additional calibration factors through testing.

4. The invention of claim 1 wherein correlated data is used to derive additional calibration factors through the use of mathematical algorithms.

5. The invention of claim 1 wherein calibration factors are derived for each of a plurality of the touch system input device active area positions within a foreground camera field of view and are stored in the calibration library look-up table.

6. The invention of claim 1 wherein fiducial marks on the screen to define the touch system active area during the calibration process are provided by visible light illumination.

7. The invention of claim 1 wherein fiducial marks provided on the screen to identify the touch system active area are laser diodes.

8. The invention of claim 1 wherein fiducial marks provided on the screen to identify the touch system active area to support the calibration process are physically or visibly removable markers.

9. The invention of claim 1 wherein fiducial marks provided on the screen to identify the touch system active area to support the calibration process are physically and visibly removable markers.

* * * * *